(12) United States Patent
Sahai et al.

(10) Patent No.: US 6,542,116 B1
(45) Date of Patent: Apr. 1, 2003

(54) DETERMINING THE SPATIO-TEMPORAL AND KINEMATIC PARAMETERS OF A SIGNAL RECEIVER AND ITS CLOCK BY INFORMATION FUSION

(75) Inventors: Anant Sahai, San Mateo, CA (US); Andrew Chou, San Mateo, CA (US); Wallace Mann, Mill Valley, CA (US); Stefano Casadei, San Francisco, CA (US)

(73) Assignee: Enuvis, Inc., South San Francisco, CA (US)

( * ) Notice: Subject to any disclaimer, the term of this patent is extended or adjusted under 35 U.S.C. 154(b) by 0 days.

(21) Appl. No.: 09/888,229

(22) Filed: Jun. 22, 2001

(51) Int. Cl.[7] .............................................. H04B 7/185
(52) U.S. Cl. .................................................. 342/357.12
(58) Field of Search ..................................... 342/357.12

(56) References Cited

U.S. PATENT DOCUMENTS

| | | | |
|---|---|---|---|
| 5,225,842 A | 7/1993 | Brown et al. ............... | 342/357 |
| 5,663,734 A | 9/1997 | Krasner ...................... | 342/357 |
| 5,781,156 A | 7/1998 | Krasner ...................... | 342/357 |
| 5,874,914 A | 2/1999 | Krasner ...................... | 342/357 |
| 5,959,944 A | 9/1999 | Dockes et al. ............... | 369/30 |
| 5,999,124 A | 12/1999 | Sheynblat .................. | 342/357.09 |
| 6,028,887 A | * 2/2000 | Harrison et al. ........ | 342/357.06 |
| 6,061,018 A | 5/2000 | Sheynblat .................. | 342/357.06 |
| 6,133,874 A | 10/2000 | Krasner .................. | 342/357.15 |
| 6,150,980 A | 11/2000 | Krasner .................... | 342/357.1 |
| 6,208,290 B1 | 3/2001 | Krasner ................... | 342/357.05 |
| 6,208,292 B1 | * 3/2001 | Sih et al. ............... | 342/357.12 |
| 6,215,442 B1 | 4/2001 | Sheynblat et al. ...... | 342/357.06 |

OTHER PUBLICATIONS

Tsui, James Bao–Yen, "Fundamentals of Global Positioning System Receivers: A Software Approach," Wiley, 2000, pp. 149–150.

Psiaki, Mark L., "Block Acquisition of Weak GPS Signals in a Software Receiver," Cornell University Presented at ION GPS 2001, Sep. 11–14, 2001, Salt Lake City, pp. 1–13.

Mike Elgersma, "Initial Solution of Pseudo–Range Equations," http://www.ima.umn.edu/gps/abstract/elgersma1, downloaded Dec. 5, 2001.

* cited by examiner

Primary Examiner—Thomas H. Tarcza
Assistant Examiner—Fred H. Mull
(74) Attorney, Agent, or Firm—Edward C. Kwok, Esq.

(57) ABSTRACT

To determine the clock doppler of a signal receiver, sampled data received from a receiver into are divided into data segments of incremental length. The clock doppler is estimated based on correlating each data segment with the expected signal from each satellite, from a set of satellites, that is overhead the receiver. For each data segment, the correlated result of each satellite is used to refine subsequent calculations of the clock doppler of the next overhead satellite. When the clock doppler calculations for a data segment have been performed using all overhead satellites from the set of satellites, then the results for that data segment are used to refine the calculations for the next data segment. If a current bounds for the clock doppler value is within a pre-determined clock doppler bound-width value and a current bounds for a delay value is within a pre-determined delay bound-width value, then a magnitude template is determined using magnitude calculations of the I and Q correlation integrals obtained at various clock doppler values and various delay values.

54 Claims, 7 Drawing Sheets

The fusion engine

```
┌─────────────────────────────────────────────────────────────────────┐
│ BEGIN STAGE ( j, l ). OBTAIN CURRENT BOUNDS FOR DOPPLER SHIFT AND CODE │
│ PHASE FROM FUSION ENGINE FOR SELECTED SOURCE.                       │
│                                                                 218 │
└─────────────────────────────────────────────────────────────────────┘
                                  │
                                  ▼
┌─────────────────────────────────────────────────────────────────────┐
│ PROCESS SELECTED SEGMENT OF DATA j AND CALCULATE NEW BOUNDS OF      │
│ DOPPLER SHIFT AND CODE PHASE FOR SELECTED SOURCE                    │
│                                                                 220 │
└─────────────────────────────────────────────────────────────────────┘
                                  │
                                  ▼
┌─────────────────────────────────────────────────────────────────────┐
│ ENCODE UPDATED BOUNDS IN FUSION ENGINE                              │
│ END OF STAGE ( j, l )                                               │
│                                                                 222 │
└─────────────────────────────────────────────────────────────────────┘
                                  │
                                  ▼
┌─────────────────────────────────────────────────────────────────────┐
│ END OF SOURCE $S_i$                                                 │
│ GO TO BLOCK 208 OF FIG. 2A UNTIL ALL THE SOURCES FROM THE SET OF    │
│ SOURCES HAVE BEEN SELECTED AS THE SELECTED SOURCE                   │
│                                                                 224 │
└─────────────────────────────────────────────────────────────────────┘
                                  │
                                  ▼
┌─────────────────────────────────────────────────────────────────────┐
│ END OF SEGMENT j                                                    │
│ SET l =0                                                            │
│ GO TO BLOCK 206 OF FIG. 2A UNTIL ALL THE DATA SEGMENTS FROM THE SET OF│
│ SEGMENTS OF DATA HAVE BEEN SELECTED AS THE SELECTED SEGMENT         │
│                                                                 226 │
└─────────────────────────────────────────────────────────────────────┘
```

FIG. 2B

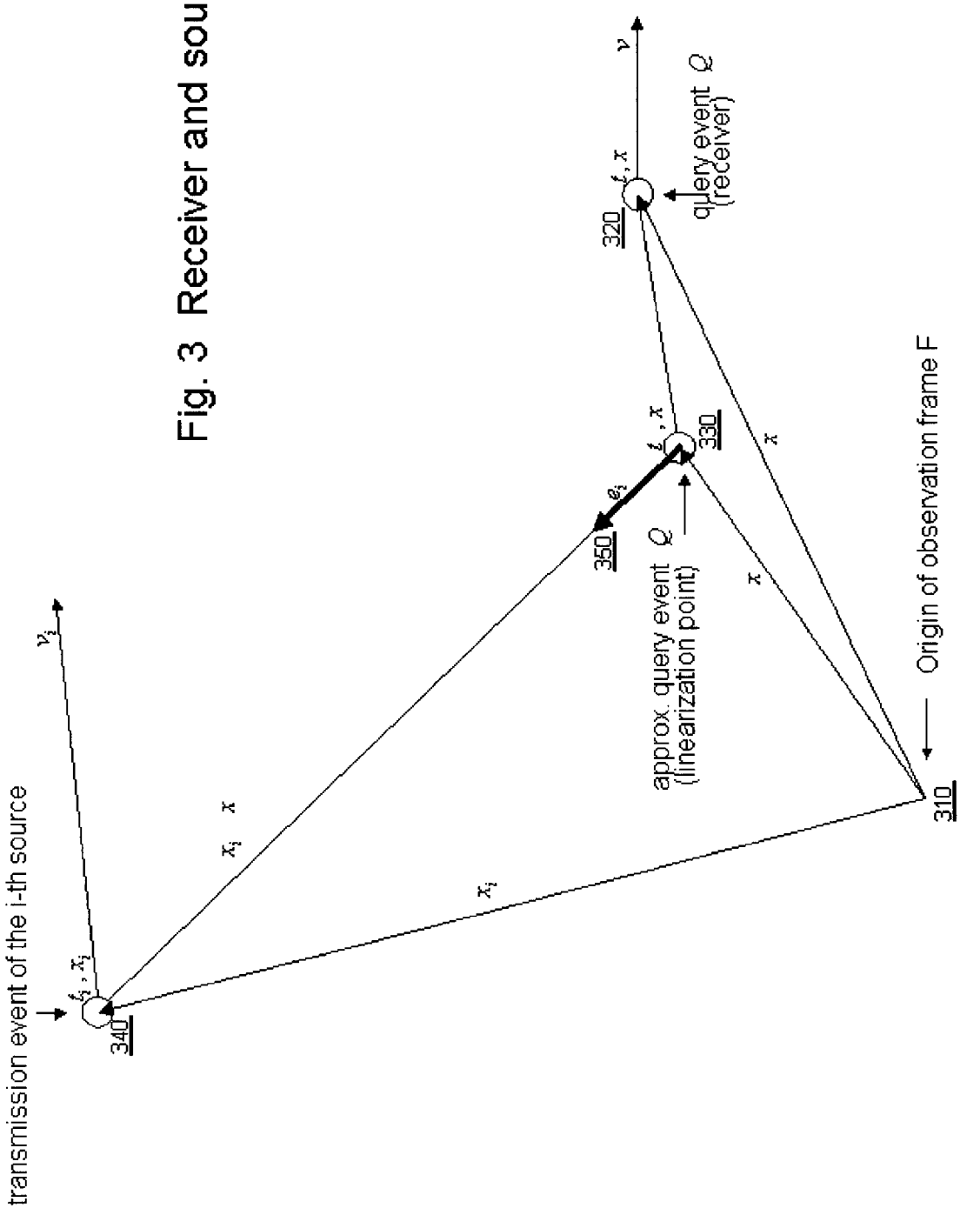
Fig. 3 Receiver and source parameters

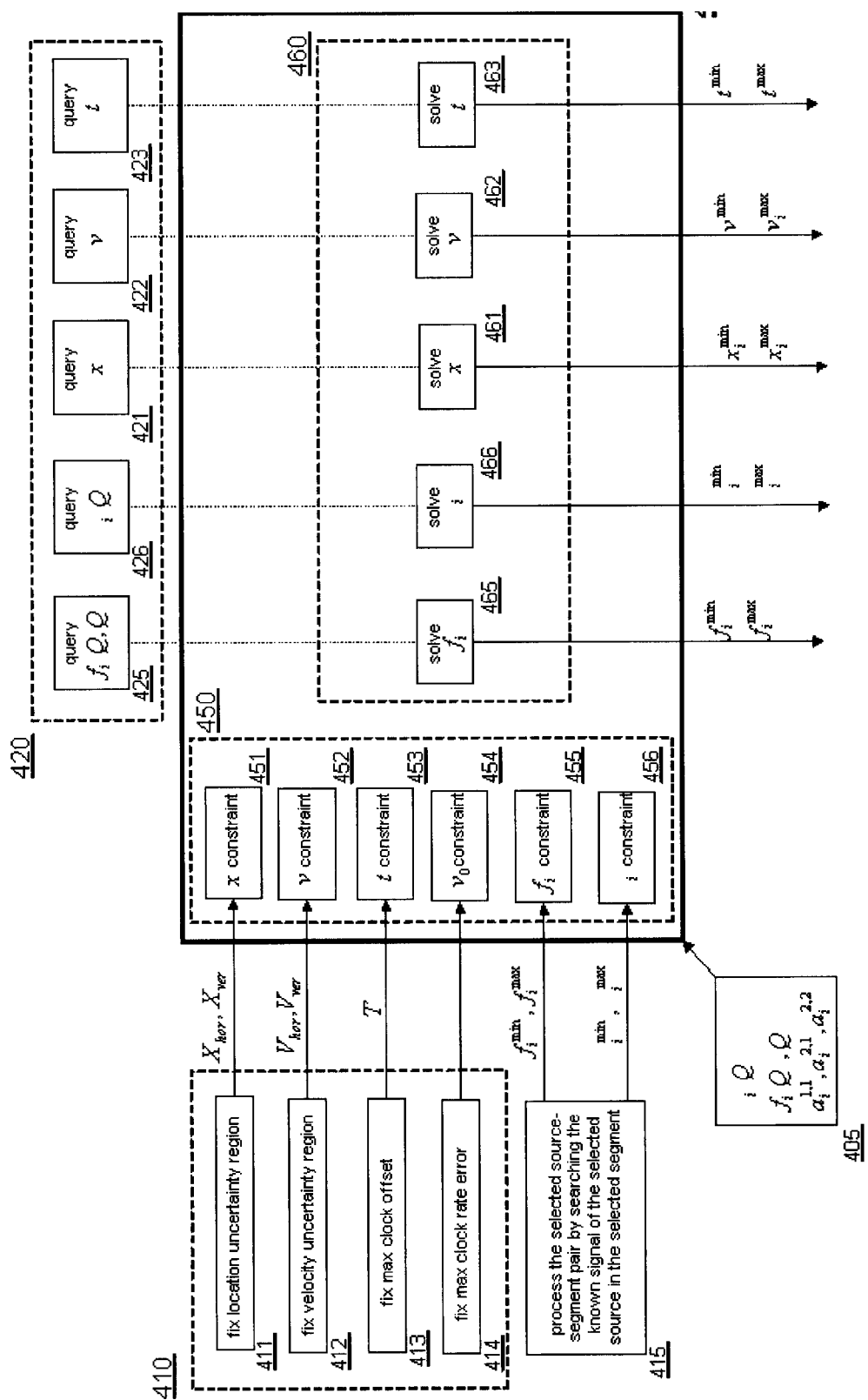
Fig. 4 The fusion engine

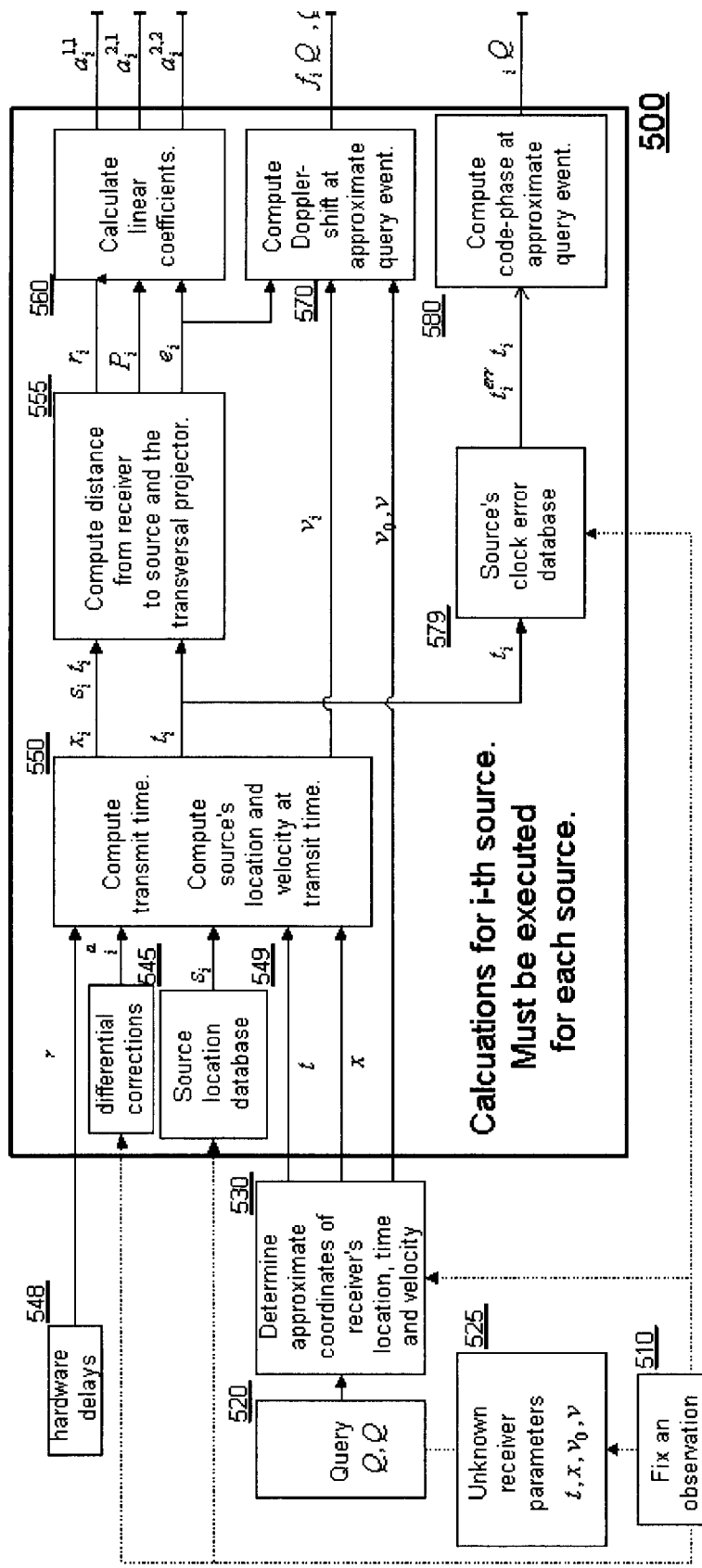
Fig. 5 Calculation of coefficients for i-th source

DETERMINING THE SPATIO-TEMPORAL AND KINEMATIC PARAMETERS OF A SIGNAL RECEIVER AND ITS CLOCK BY INFORMATION FUSION

FIELD OF THE INVENTION

The present invention relates to signal processing and, more particularly, to techniques for estimating certain parameters by means of processing a received signal containing possible contributions from known signals originating from multiple sources.

BACKGROUND OF THE INVENTION

In general, before a known signal is received by a receiver, the known signal is modified by effects due to various receiver parameters such as the receiver's spatio-temporal location, the receiver's velocity and the offset and drift rate of the receiver's clock. The receiver's location affects the signal delay, that is the unknown amount of time by which the signal is delayed in the course of traveling from the source to the receiver. In addition, the carrier frequency of the known signal is shifted by an unknown amount due to the receiver's clock drift and the Doppler shift caused by the relative motion of the receiver with respect to the source. Clock drift is herein referred to as "clock Doppler". The overall frequency shift, herein referred to as "Doppler shift", is the sum of clock Doppler and motion Doppler. The motion Doppler is further decomposed into source motion Doppler and receiver motion Doppler. In many applications, the source motion Doppler is known and the unknown Doppler shift depends only on unknown receiver parameters, such as clock Doppler and receiver motion Doppler.

The signal that is received at the receiver, which typically includes noise, is generally referred to as the "received signal", or also "data". For many applications, when a receiver samples the received signal for a long duration of time, it is important to know the carrier frequency of the received signal to a high degree of accuracy in order to process the received signal using coherent correlation methods. In particular, for signals sampled over a long duration, an inaccurate estimation of the carrier frequency will often result in out-of-phase correlations. Estimation of the carrier frequency is equivalent to estimation of the Doppler shift. The carrier frequency and delay of a known signal are herein referred to also as "signal parameters".

Typically, in the case of multiple known signals being transmitted to a receiver by multiple sources, as in the case of Global Positioning System, the Doppler shifts and delay values of the received signals are independently calculated for each satellite vehicle that is potentially overhead the receiver.

A significant disadvantage to the above approach is that the approach does not leverage the calculations for the signal and receiver parameters performed with respect to one source against the calculations with respect to another source, thus resulting in a high computational expense. Further, the approach does not take advantage of the fact that it may be possible to obtain a coarse estimate of certain signal and receiver parameters with small computational expense by processing a small segment of the received signal. A coarse estimate obtained from a small data segment can be used to significantly reduce the computational expense in processing a larger data segment and/or the entire segment of received data.

Based on the foregoing, there is a clear need for a technique to determine the receiver parameters and the carrier frequencies and delays of the known signals that leverages the information gathered from a subset of the sources and from shorter segments of the received signal to reduce the calculations needed to process the entire duration of the received signal and the entire set of sources.

SUMMARY OF THE INVENTION

Techniques are provided for determining the spatio-temporal and kinematic receiver parameters and, in addition, the Doppler shifts and the signal delays (the signal parameters) of multiple known signals transmitted by multiple sources. One aspect of the invention is to divide the sampled data received by the receiver into possibly overlapping segments of data, herein referred to as "data segments". In some embodiments, these segments form a nested sequence of segments of increasing length. Receiver and signal parameters are estimated by searching for the known signals in the various data segments. Each pair consisting of a source and a data segment, herein referred to as "source-segment" pair, yields a piece of information obtained by means of searching for the known signal corresponding to that source in that data segment. In some embodiments, the search is carried out by correlating data segments with the known signals for a suitable set of signal parameter values. The information recovered from the source-segment pairs that have already been processed is used to reduce and refine the calculations for the other source-segment pairs.

A "fusion engine" is used to store and integrate the information on receiver parameters and signal parameters gathered at any intermediate stage from the source-segment pairs that have been processed. Such information is represented inside the fusion engine by means of an "uncertainty region representation", which in some embodiments consists of a set of inequalities. At any stage, the engine uses the current uncertainty region representation to generate estimates and bounds of signal parameters (such as Doppler shifts and delay values) used to guide the search in the subsequent stages. Estimates and bounds of signal parameters and receiver parameters get refined as more stages are completed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A and FIG. 2B are flowcharts that illustrate the functional overview of a technique for estimating receiver parameters.

FIG. 3 illustrates the geometric and kinematic parameters of the receiver relative to one particular source;

FIG. 4 illustrates one embodiment of a fusion engine which integrates receiver parameters, signal delay values and carrier frequency information obtained from a subset of sources and from segments of the received signal;

FIG. 5 is a flowchart that illustrates the calculations to determine the coefficients used in one embodiment of the fusion engine based on Linear Programming;

DETAILED DESCRIPTION OF THE PREFERRED EMBODIMENT

Techniques are provided for estimating the spatio-temporal and kinematic parameters of a signal receiver that receives multiple known signals transmitted by multiple sources. These spatio-temporal and kinematic parameters of a receiver can include such parameters as position, velocity, clock offset, clock drift rate, etc. In addition, the provided techniques estimate signal parameters such as the signal delay and carrier frequencies associated with the set of sources. In the following description, for the purposes of explanation, numerous specific details are set forth in order to provide a thorough understanding of the present invention. It will be apparent, however, to one skilled in the art, that the present invention may be practiced without these specific details. In other instances, well-known structures and devices are shown in block diagram form in order to avoid unnecessarily obscuring the present invention.

System Overview

Figure 1:
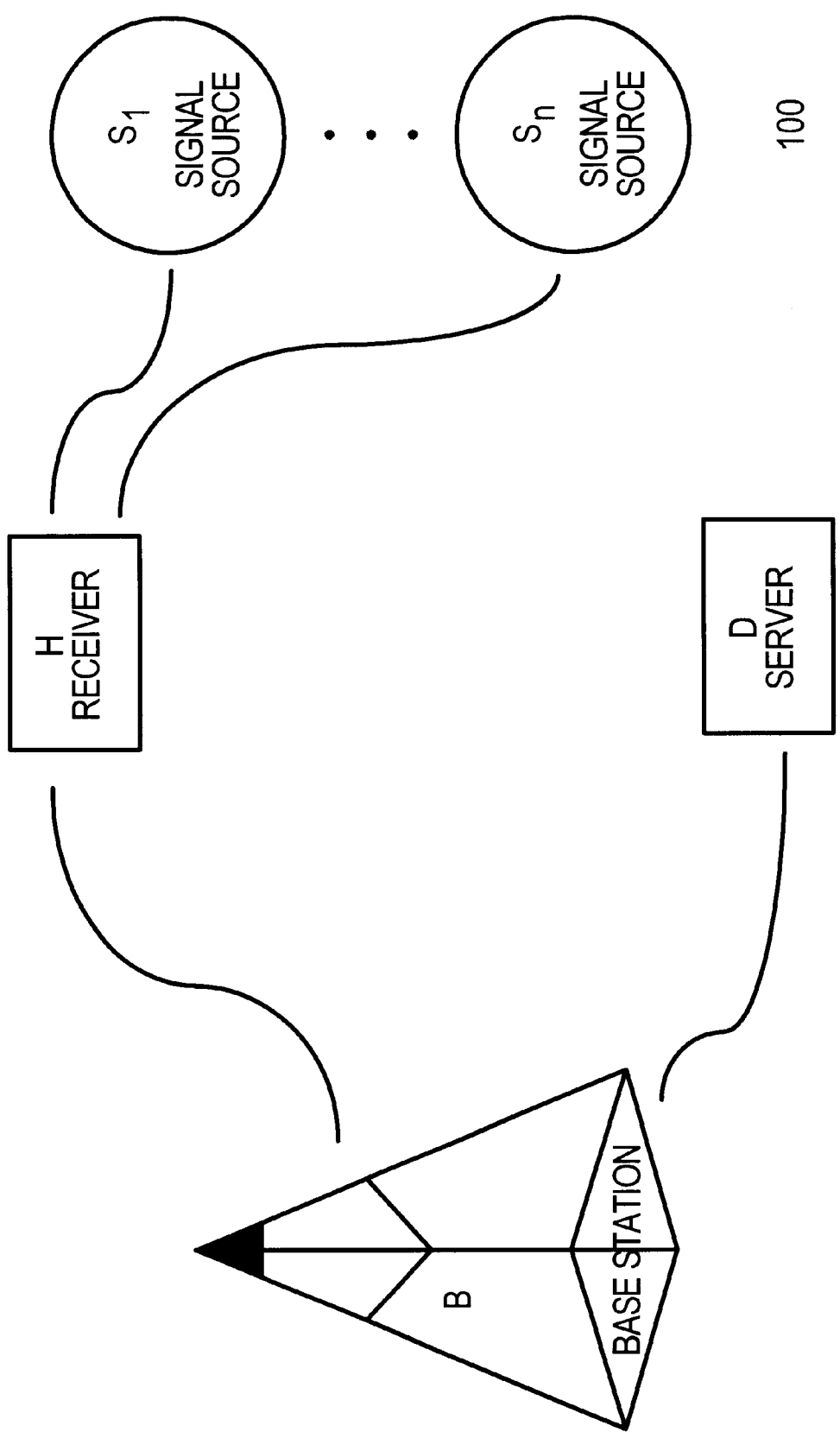
FIG. 1 is a block diagram that illustrates a system overview of a multi-stage technique for estimating receiver parameters and signal parameters.

FIG. 1 is a block diagram that illustrates a system overview for estimating receiver parameters. In one embodiment, these parameters are estimated by means of determining the carrier frequency (equivalently, the Doppler shift) and the signal delay of the different known signals that contribute to a received signal that is received at the receiver as explained below. System 100 comprises a plurality of signal sources of which only signal sources $S_1$ and $S_n$ are shown in FIG. 1. In addition, system 100 comprises a receiver H, a base station B, and a server D. By way of example, only one base station and one server are shown in system 100. For example, in a practical system, there may be multiple base stations and multiple servers. In other embodiments of the invention, the server may be co-located with the base station or with the receiver.

Signal sources $S_1$ and $S_n$ may represent a variety of different signal sources. For example, signal sources $S_1$ and $S_n$ may be satellites. Receiver H may represent a variety of receiver devices such as Global Positioning System receivers, cell phones with embedded signal receivers, Personal Digital Assistants (PDAs) with embedded signal receivers, etc. For the purpose of explanation, the embodiments of the invention are explained with respect to a set of Global Positioning System (GPS) satellite vehicles that are overhead the location of receiver H at a given time. Thus, in the example, $S_1$ through $S_n$ is the plurality of signal sources that make up the set of GPS satellite vehicles that are overhead the location of receiver H at any given time.

By way of example, the GPS satellite vehicles produce analog signals. Each analog signal is transmitted to receiver H. The signal that is received at H is herein referred to as "received signal". Thus, the received signal contains, in addition to noise, contributions from multiple GPS satellite vehicles that are overhead the receiver H. In certain embodiments of the invention, H converts the analog signal into a discrete sequence of values as a function of time by digitizing the received signal. The digitized received signal is herein referred to as a "sampled signal" or "sampled data". In one embodiment of the invention, H transmits the sampled data to server D for processing.

Assuming there is an unknown delay in time from the time the analog signal leaves a particular GPS satellite vehicle and the time the signal is received at receiver H, such a delay is herein referred to as a "delay value". The distance between the GPS vehicle and the receiver H can be estimated from an estimate of the delay in the known signal corresponding to the particular GPS vehicle. However, this distance estimate is biased by the receiver's clock offset. By combining estimates from different satellites it is possible to estimate the clock offset and correct the distance estimates for the clock offset bias.

Further, by the time the signal that is being transmitted by each of the satellite vehicles overhead reaches the receiver, the signal's original carrier frequency is shifted by an unknown amount due to a Doppler shift, which may, for example, include a satellite clock Doppler, a receiver clock Doppler, source motion Doppler and/or receiver motion Doppler. If it is assumed that the position of the receiver is known; that the motion of each signal source (satellite vehicles, for example) is known; and that the satellite clock Dopplers are also known, then the sum of receiver clock Doppler and receiver motion Doppler can be estimated by determining the carrier frequency of the different signals that comprise the received signal. By combining information from different satellites it is possible to separate clock Doppler from receiver motion Doppler and to determine the clock Doppler and the velocity of the receiver.

Functional and Operational Overview

Figure 2A:
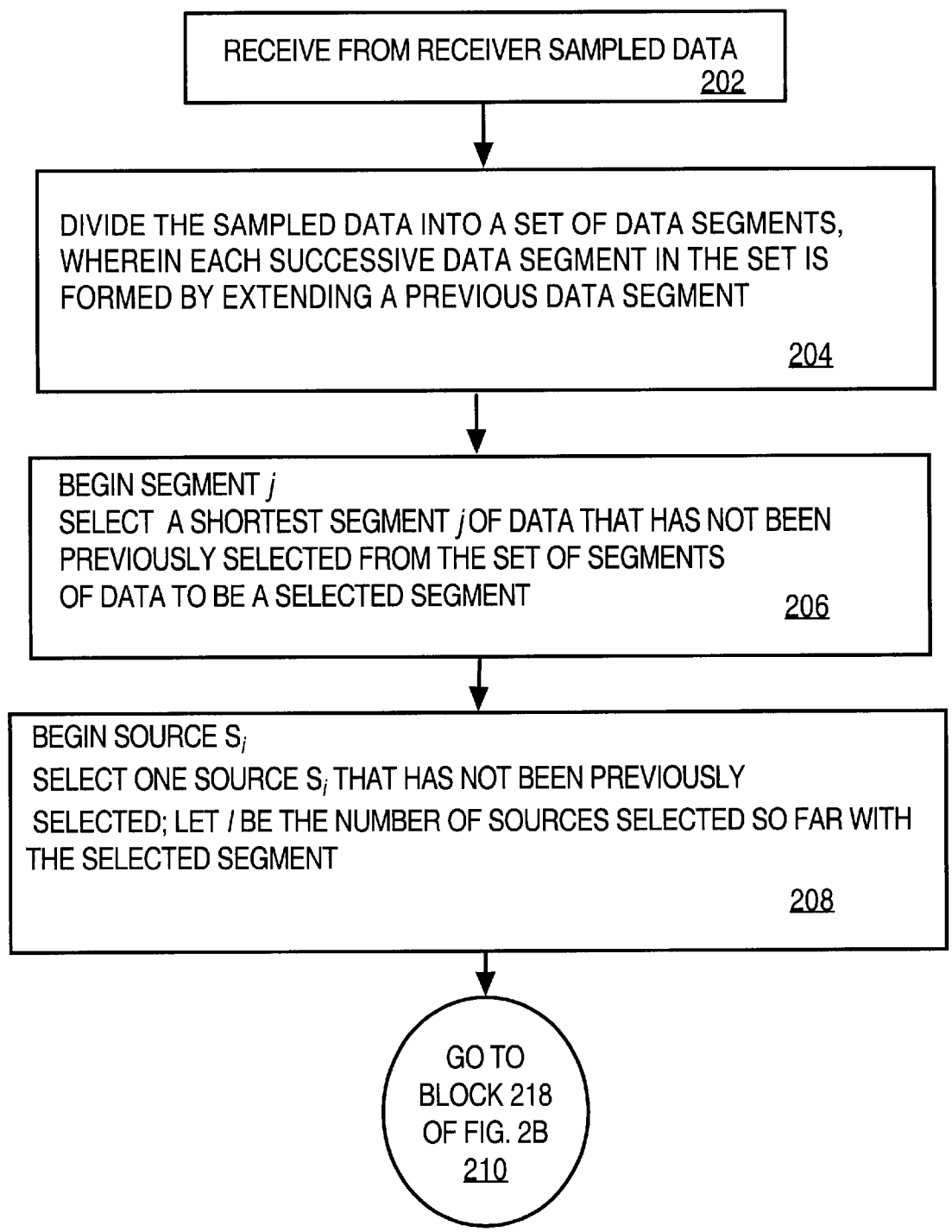

FIG. 2A and FIG. 2B are flowcharts that illustrate the functional overview of a technique for estimating the spatio-temporal and kinematic parameters of the receiver and, in addition, the Doppler shifts and the signal delays of multiple known signals transmitted by multiple sources. In the preferred embodiment, it is assumed that the positions and velocities of all the sources and their clock's offsets and drift rates are known at any point in time. Further, it is assumed that an initial coarse estimate of the receiver location, the receiver velocity, and the receiver's clock time offset and clock Doppler can be obtained, in addition to uncertainty bounds on these values.

In the particular embodiment shown in FIG. 2 the segments of data form a nested sequence of increasing length, as explained below. Further, the source-segment pairs are processed in an order determined by an outer loop over the increasing sequence of nested segments and an inner loop over the set of sources. One skilled in the art can see that other orderings of the source-segment pairs can also be used.

Figure 2C:
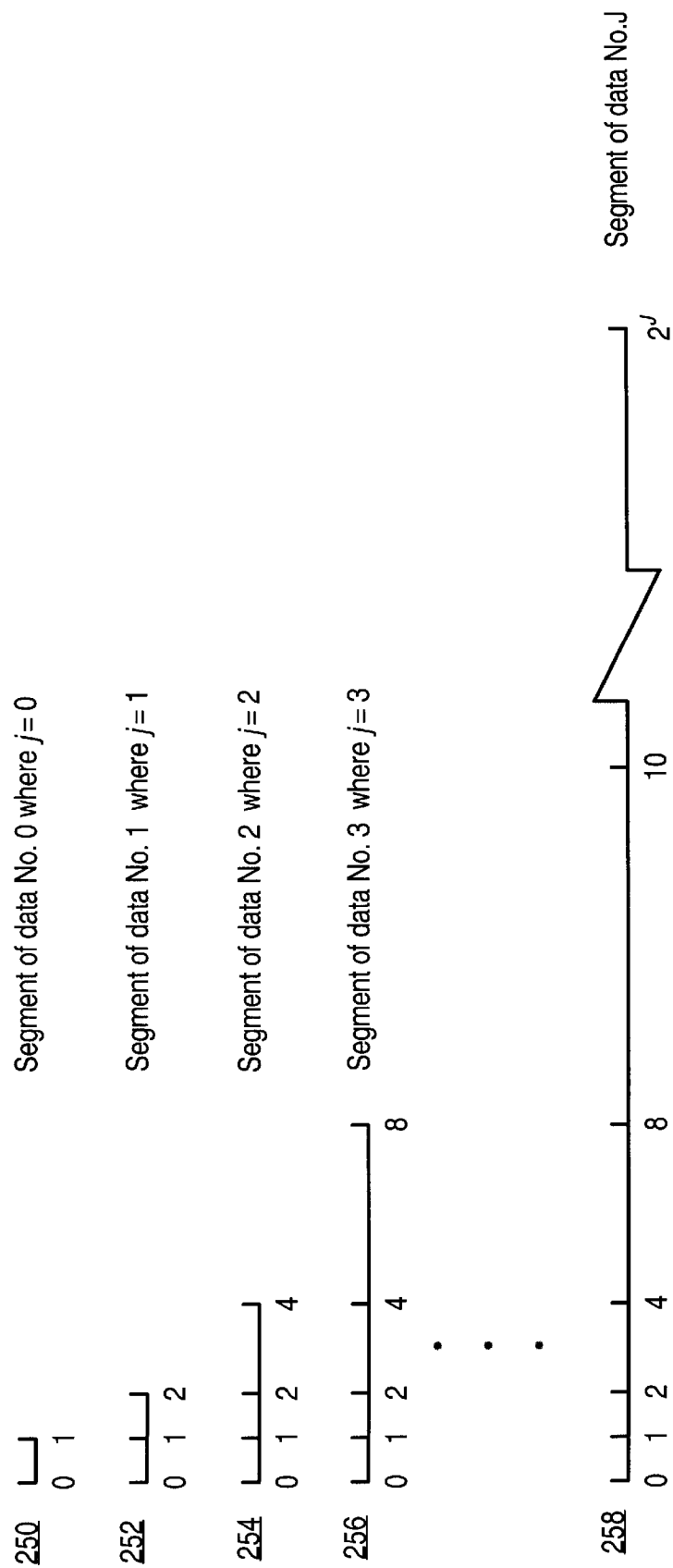
FIG. 2C is a block diagram that illustrates increasing data segments.

At block 202 of FIG. 2A, the sampled data associated with the received signal is received for analysis by server D. At block 204, the sampled data is divided into a set of increasing data segments, wherein each successive data segment in the set is formed by extending a previous data segment to include additional data from the sampled data. Thus, the data segments are extended in an incremental manner. By way of example, FIG. 2C is a block diagram that illustrates increasing data segments. There are (J+1) number of segments. Segment 250 is the first data segment, segment 252 is the second data segment, etc. Segment 258 is the J-th data segment. For segment 250, j is zero, for segment 252, j is 1, etc. As can be seen from FIG. 2C, each successive segment includes the previous segment and additional data from the sampled data. In certain embodiments of the invention, the length of each segment is proportional to $2^j$.

At block 206 of FIG. 2A, a shortest data segment j that has not been previously selected is selected from the set of data segments to be a selected segment. In the first stage, the shortest segment that is selected is the data segment for which j is zero. At block 208, one source $S_i$ that has not been previously selected with the selected segment j is selected to be the selected source. Let l be the total number of sources that have been selected so far for the selected segment j. At block 210, control is passed to block 218 of FIG. 2B. This begins the stage (j, l) of the method.

At block 218 of FIG. 2B, queries 425 and 426 (FIG. 4) are submitted to the fusion engine 430 to obtain current bounds for the Doppler shift $[f_i^{min}, f_i^{max}]$ and the code-phase $[\sigma_i^{min},$ $\sigma_i^{max}$] of the known signal corresponding to the selected source $S_i$. The code-phase is an equivalent representation of the signal delay, as one skilled in the art will see after reading section "Linear expression for code-phase and Doppler shift". Examples of how these uncertainty intervals are calculated are described in section "Calculation of uncertainty intervals".

At block 220 of FIG. 2B, the calculations (e.g. correlations) for data segment j and the known signal of source $S_i$ are performed as explained in section "Calculation of uncertainty intervals" and new bounds [$f_i^{min}$, $f_i^{max}$], [$\sigma_i^{min}$, $\sigma_i^{max}$] are calculated. At block 222, the updated uncertainty intervals [$f_i^{min}$, $f_i^{max}$] and [$\sigma_i^{min}$, $\sigma_i^{max}$] are encoded as constraints 455, 456 in the fusion engine 430 of FIG. 4. In some embodiments, the fusion engine will use the updated uncertainty intervals coming from this source-segment pair to replace any previous uncertainty constraints that had been explicitly associated with this source in previous stages. This terminates the stage (j, l) of the method.

At block 224, control is passed to block 208 of FIG. 2A until all the sources have been selected as the selected source. If all the sources from the set of sources have been selected to be the selected source, then control passes to block 226 and the set of selected sources is cleared by setting l=0. At block 226, control is passed to block 206 of FIG. 2A until all the data segments from the set of data segments have been selected to be the selected segment. The operation as described with reference to FIG. 2A and FIG. 2B is complete once all the data segments from the set of data segments have been selected as the selected segment.

Spatio-temporal Coordinates of the Receiver

In some embodiments of the invention, a query is made at a particular point in time to request information about the location of the receiver and possibly other receiver parameters such as receiver velocity, clock offset and clock drift rate. This will be called the "query event" and denoted Q. The query event Q can be parameterized by a total of four coordinates, one temporal and three spatial. These coordinates are unknown and one objective of this invention is to estimate them. The specific values of these coordinates depend on the particular coordinate system, also called "observation frame" and denoted F, which was chosen beforehand. Let (t, $\vec{x}$) be the spatio-temporal coordinate of the query event Q in the frame F. The velocity of the receiver in the frame F at the query time is denoted $\vec{v}$.

The relative position of the receiver with respect to one particular signal source is illustrated in FIG. 3. Block 310 is the origin of the coordinate system F. Block 320 is the query event Q that coincides spatially with the receiver and temporally with the time instant at which the receiver parameter must be estimated. Block 330 is a known approximation to the query event, denoted Q*, which is used in the preferred embodiment as the linearization point. Block 340, the i-th "transmission event", is located at the position of source $S_i$ at the time when $S_i$ transmits the known signal arriving to the approximate receiver location $\vec{x}*$ at the approximate query time t*. The spatio-temporal coordinate of the i-th transmission event 340 is denoted ($t_i*$, $\vec{x}_i$). The velocity of source $S_i$ at time $t_i*$ is denoted $\vec{v}_i$.

Block 350 is the unit vector $\vec{e}_i$ that points from $\vec{x}*$ to the source location $\vec{x}_i$. This unit vector is used in several calculations described ahead.

Examples of Valid Observation Frames

An example of a valid observation frame is an Earth-centered inertial frame $F^{eci}$, where the spatial origin coincides with the center of the Earth and where the Earth rotates around the z-axis with a period of 24 hours (many such frames exist according to how the time origin and the x, y-axis are chosen). In this frame, the receiver's velocity $\vec{v}$ at the query time is given by the velocity of the Earth's surface near the receiver due to the Earth's rotation plus the relative velocity of the receiver with respect to the Earth's surface.

Another example of a valid observation frame is the "locally-Earth-fixed" inertial frame $F^{lefi}(Q)$ whose origin is the event Q and whose motion "cancels out" the rotational velocity of the Earth's surface near the receiver at the query time. In this frame, the receiver's velocity at the query time is the same as the receiver's velocity with respect to the Earth's surface. More specifically, $F^{lefi}(Q)$ is defined by the following properties: the spatio-temporal origin of $F^{lefi}(Q)$ is the event Q; the Earth's surface near the receiver is stationary at the query time in the frame $F^{lefi}(Q)$; in the Earth-centered inertial frame $F^{eci}$, the frame $F^{lefi}(Q)$ moves with constant velocity at all times; (equivalently, the Earth's center and Earth's axis move with constant velocity in the frame $F^{lefi}(Q)$); at the query time, the three spatial axes of $F^{lefi}(Q)$ are aligned along the longitude, latitude and altitude directions, respectively. It should be noted that $F^{lefi}(Q)$ and $F^{eci}$ are inertial with respect to each other, that is, their relative acceleration is zero.

One skilled in the art will see that many other reference frames are possible and can be used in connection with this invention.

The Linear Programming Engine and the Multi-stage Method

FIG. 4 illustrates one embodiment of a fusion engine based on Linear Programming (LP) that, at any stage, stores and integrates available information and use it to deduce new information to speed-up the future calculations and to refine the estimates of the parameters of interest. One skilled in the art will see how such techniques as the Simplex Method and Interior Point Methods, among others, can be used in LP to maximize and minimize the functions of interest over the uncertainty region. In one embodiment, a stage is defined by which segment of received signal is currently being selected for processing (denoted j in the embodiment of FIG. 2) and by the number l of sources whose known signals have been processed with the current segment. In one embodiment, this processing consists of correlation calculations and searches.

Certain termination conditions can be tested between selected stages to determine whether sufficient information has been gathered. For instance, in some embodiments of this invention, the test is whether the location uncertainty region of the receiver is contained in a box smaller than a certain size. The sides of the box can be determined by minimizing and maximizing the basic location variables over the current uncertainty region. In other embodiments, the test is whether the receiver is inside (or outside) a given region, e.g. a certain city block. One skilled in the art will be able to appropriately formulate many other termination conditions based on the specific application requirements at hand.

Block 405 represents the linear coefficients and offsets used by the fusion engine. These coefficients and offsets are calculated once at the outset as described in FIG. 5 and section "Calculation of the linear coefficients and offsets". They may also be re-calculated one or more times at a new linearization point if the estimate of the receiver parameters becomes significantly different from the current linearization point and if a more accurate linear approximation is needed. One skilled in the art will see how Taylor series residuals and other known techniques for quantifying and bounding linear approximation error can be used with application specific knowledge to determine what constitutes a significant difference.

Block 410 represents the information available at the beginning of the method. In some embodiments, 410 contains four pieces of information: an uncertainty region that contains (with a suitably high degree of confidence) the three-dimensional location $\vec{x}$ of the receiver (block 411); an uncertainty region that contains (with a suitably high degree of confidence) the three-dimensional velocity $\vec{v}$ of the receiver (block 412); the maximum value of the receiver's clock offset (block 413); and the maximum value of the receiver's clock drift rate (block 414).

At block 415, the selected source-segment pair is processed to calculate updated uncertainty intervals for the Doppler shift and code-phase $f_i$ and $\sigma_i$. The details of this are in section "Calculation of uncertainty intervals". Block 415 is repeated at every stage of the method.

Block 450 is the fusion engine's internal representation of the available information which, in LP embodiments of the fusion engine, consists of a set of linear inequalities, as explained in more details in section "Encoding given information". In some embodiments, linear inequality constraints exist for the three-dimensional location $\vec{x}$ of the receiver (block 451); the three-dimensional velocity $\vec{v}$ of the receiver (block 452); the one-dimensional receiver's clock offset (block 453); and the one-dimensional drift rate of receiver's clock (block 454).

Blocks 425 and 426 are the queries submitted by the multi-stage method that searches the selected known signal in the selected segment of received signal. These queries are processed by blocks 465 and 466 that, in the LP embodiment, consist of linear programming optimizations.

Block 420 is a set of possible queries about receiver parameters. Typically, these queries are submitted at the end of the multi-stage method when the information about receiver parameters is the most accurate. Or, they can be submitted at certain stages to help decide whether the method should terminate. In some embodiments, block 421 can request the minimum and maximum coordinates of the receiver's location along three orthogonal axes (e.g. longitude, latitude and altitude). Similarly, block 422 can request information about minimum and maximum velocity of the receiver and block 433 can request information about the clock offset of the receiver.

Determining the Linearization Point

Block 530 of FIG. 5 determines an initial coarse estimate of $(t, \vec{x})$, which will be denoted $(t^*, \vec{x}^*)$. For example, if the receiver is connected to a cellular network, $\vec{x}^*$ can be set to be the location of the cell tower that picks up the signal from the receiver and $t^*$ can be set to be the query time as measured by the receiver's clock. In general, $t^*$ is not exactly the same as the true query time $t$ because of the inaccuracy of the receiver's clock. The event corresponding to the known spatio-temporal coordinate $(t^*, \vec{x}^*)$ in the frame F will be denoted $Q^*$.

The initial coarse estimate to the receiver's velocity $\vec{v}$ is denoted $\vec{v}^*$. For example, if F is chosen to be $F^{eci}$, then an approximate value for $\vec{v}$ is the rotational velocity of the Earth's surface near the receiver. If instead F is a frame in which the Earth is stationary at the query event (for instance, if $F=F^{left}(Q^*)$), one should set $\vec{v}^*=0$, unless the receiver is known to be moving in a certain direction with respect to the Earth's surface.

Let also $v_0^*/c$ denote a known approximation to the clock's rate $v_0/c$. If no information is available on whether the receiver's clock is fast or slow, then one should set $v_0^*/c=1$.

The known quantities $(t^*, x^*)$, and $(v_0^*, \vec{v}^*)$ in the frame F represent a linear space-time trajectory that passes through the approximate query event $Q^*$. This linear trajectory, denoted $(Q^*, \dot{Q}^*)$, is the linearization point used for the equations described in the next section. Within a particular frame F, one can view $(Q^*, \dot{Q}^*)$ as a shorthand for its F-coordinates:

$$(Q^*, \dot{Q}^*) \equiv_{|F} (t^*, x^*, v_0^*, \vec{v}^*)$$

These coordinates are computed at block 530.

Linear Expression for Code-phase and Doppler Shift

The piece of known signal transmitted by source $S_i$ and collected by the receiver begins at a particular point in time which is called the "code-phase" of source $S_i$ is and denoted $\sigma_i(Q)$. The code-phase $\sigma_i(Q)$ is the time, as recorded by the source clock, at which the first sample of the collected signal was transmitted by source $S_i$.

Let $\sigma_i(Q^*)$ be the initial estimate of the code-phase, that is, the code-phase that the receiver would see if the query were truly submitted at location $x^*$ and time $t^*$. Similarly, $f_i(Q, \dot{Q})$ denotes the Doppler shift seen by the receiver, and $f_i(Q^*, \dot{Q}^*)$ denotes the Doppler shift that the receiver would see if its space-time trajectory were truly $(Q^*, \dot{Q}^*)$. By assuming that $(Q^*, \dot{Q}^*)$ is sufficiently close to $(Q, \dot{Q})$, it is possible to express the differences $\sigma_i(Q^*)-\sigma_i(Q)$ and $f_i(Q^*, \dot{Q}^*)-f_i(Q, \dot{Q})$ in terms of $(t-t^*, \vec{x}-\vec{x}^*)$ and $(v_0-v_0^*, \vec{v}-\vec{v}^*)$. These linear equations are given by:

$$\sigma_i(Q) = \sigma_i(Q^*) + (t - t^*) + \frac{1}{c}\vec{e}_i \cdot (\vec{x} - \vec{x}^*), \quad (1)$$

$$f_i(Q, \dot{Q}) = f_i(Q^*, \dot{Q}^*) - \frac{f_c}{c}(v_0 - v_0^*) + \quad (2)$$

$$\frac{f_c}{c}\vec{e}_i \cdot (\vec{v} - \vec{v}^*) +$$

$$\frac{f_c}{c} \frac{\vec{v}_i - \vec{v}^*}{r_i} \cdot P_i^{\perp}(\vec{x} - \vec{x}^*),$$

where $\vec{e}_i$ is the unit vector from $\vec{x}^*$ to the spatial coordinate of source $S_i$ in the frame F (denoted $\vec{x}_i$), at transmission time:

$$\vec{e}_i = \frac{\vec{x}_i - \vec{x}^*}{\|\vec{x}_i - \vec{x}^*\|}; \quad (3)$$

$r_i$ denotes the distance $$r_i = \|\vec{x}_i - \vec{x}^*\|; \quad (4)$$

$\vec{v}_i$ is the velocity of source $S_i$ in the frame F at transmission time; $P_i^\perp$ is the projection matrix that projects on the space orthogonal to the vector $\vec{e}_i$ and is defined by $$P_i^\perp \vec{b} = \vec{b} - (\vec{b} \cdot \vec{e}_i) \vec{e}_i, \quad (5)$$

where $\vec{b}$ is an arbitrary three-dimensional vector; c is the speed of light in vacuum; $f_c$ is the carrier frequency of the known signal; and · denotes the Euclidean inner product of two vectors. Block 555 of FIG. 5 calculates $\vec{x}_i$, $\vec{v}_i$ and $P_i^\perp$, as described in section "Calculation of the linear coefficients and offsets".

Equations (1) and (2) can be rewritten as $$\sigma_i(Q) = \sigma_i(Q^*) + a_i^{1,1} \cdot x \quad (6)$$

$$f_i(Q, \dot{Q}) = f_i(Q^*, \dot{Q}^*) + a_i^{2,2} \cdot v + a_i^{2,1} \cdot x, \quad (7)$$

where the new four-dimensional variables x and v are given by:

$$x = (ct - ct^*, \vec{x} - \vec{x}^*) \quad (8)$$

$$v = (v_0 - v_0^*, \vec{v} - \vec{v}^*) \quad (9)$$

and the coefficients $a_i^{1,1}$, $a_i^{2,2}$, $a_i^{2,1}$ are given by:

$$a_i^{1,1} = \frac{1}{c}(1, \vec{e}_i), \quad (10)$$

$$a_i^{2,2} = \frac{f_c}{c}(-1, \vec{e}_i), \quad (11)$$

$$a_i^{2,1} = \frac{f_c}{c}\frac{1}{r_i}(0, (\vec{v}_i - \vec{v}^*)P_i^\perp). \quad (12)$$

The linear equations (6) and (7) are valid in any observation frame F' that moves with constant velocity with respect to F, provided that this velocity is sub-relativistic, that is, much smaller than c. One skilled in the art will see that many equivalent embodiments of this invention are obtained by choosing one of these many possible frames.

Calculation of the Linear Coefficients and Offsets

The linear equations used by the fusion engine are obtained by linearizing the kinematic equations of the source's motion with respect to the receiver. This linearization is based on an initial estimate of the receiver location and receiver velocity.

In this section a method is provided to calculate the linear coefficients $a_i^{1,1}$, $a_i^{2,2}$, $a_i^{2,1}$ and the offset parameters $\sigma_i(Q^*)$ and $f_i(Q^*, \dot{Q}^*)$, which are used for encoding the given information and for deducing the new requested information. Although the description here is for how to calculate these parameters in the frame $F = F^{eci}$, one skilled in the art can transform these parameters and perform analogous calculations in any another valid frame. These calculations are illustrated in FIG. 5.

The first step, block 510, consists in choosing an appropriate observation frame F. Block 520 is the query event, parameterized by four spatio-temporal coordinates $(t, \vec{x})$ and four additional kinematic coordinates $(v_0, \vec{v})$ (block 525). Block 530 determines an initial coarse estimate of the receiver parameters.

Block 550 calculates the F-time $t_i^*$ at which the signal was emitted by the source. The parameter $t_i^*$ satisfies the following equation:

$$t^* - t_i^* = \frac{1}{c}\|\vec{s}_i(t_i^*) - \vec{x}^*\| + \tau_i^a + \tau^r, \quad (13)$$

where $\tau_i^a$ are atmospheric delays calculated by using the differential corrections computed by block 545; $\tau^r$ is the additional delay caused by analog processing at the receiver. The parameter $\tau^r$ is obtained from block 548. The function $\vec{s}_i(t_i)$, stored in the database at block 549, represents the position of source $S_i$ at any F-time $t_i$. One skilled in the art knows how to implement blocks 545, 548 and 549. Further, one skilled in the art can develop an iterative procedure to calculate the solution $t_i^*$ of equation (13).

Once the transmission time $t_1^*$ has been calculated, block 550 calculates source location $\vec{x}_i$ by letting $$\vec{x}_i = \vec{s}_i(t_i^*)$$

and the source's velocity $\vec{v}_i$, obtained by differentiating the function $\vec{s}_i(t_i)$ and evaluating it at $t_i = t_i^*$:

$$\vec{v}_i = \left.\frac{d\vec{s}_i(t_i)}{dt_i}\right|_{t_i = t_i^*}.$$

Block 555 calculates the parameters $\vec{e}_i$, $r_i$ and $P_i^\perp$ by using formulas (3), (4) and (5). Block 560 calculates the linear coefficients $a_i^{1,1}$, $a_i^{2,2}$, $a_i^{2,1}$ by means of the formulas (10–12). Block 580 computes the offset parameter $\sigma_i(Q^*)$, given by:

$$\sigma_i(Q^*) = (t_i^* + \delta t_i^{err}(t_i^*)) \quad (14)$$

where $\delta t_i^{err}(t_i^*)$ is a correction to the source's clock. More specifically, $t_i^* + \delta t_i^{err}(t_i^*)$ is what the source believes the time is at time $t_i^*$. The function $\delta t_i^{err}(t_i)$ is stored in the database 579.

In the GPS embodiment, since each known signal repeats itself with a period of $T_o = 1$ ms, the code-phase can also be calculated by the formula $$\sigma_i(Q^*) = (t_i^* + \delta t_i^{err}(t_i^*))(\text{mod } T_o) \quad (15)$$

where $z(\text{mod } T_o)$ denotes the remainder of the division of z by $T_o$. If this formula is used, all additions of code-phase quantities have to be carried out "modulo $T_o$", as one skilled in the art can see. This applies to all the formulas that involve code-phase quantities.

Block 570 calculates the Doppler shift $f_i(Q^*, \dot{Q}^*)$ by using the formula:

$$f_i(Q^*, \dot{Q}^*) = \frac{f_c}{c}\vec{e}_i \cdot (\vec{v}_i - \vec{v}^*) - f_c\left(\frac{v_0^*}{c} - 1\right). \tag{16}$$

If at any stage the center of the uncertainty region of the receiver parameters moves significantly from the initial coarse estimate $(Q^*, \dot{Q}^*)$, then the center of the uncertainty region can be set to be the new linearization point. This is done by carrying out again the calculations described in this section at the new linearization point. This step can be repeated more than once, as needed.

Encoding Given Information

At any stage during the application of the method, certain information is available about various unknown parameters and variables. The method is initialized with certain information. Subsequently, and on the basis of the processing of the data samples, additional information can be made available. As the method proceeds, the available information is used to deduce new information (see section "Deducing new information"), and the new information is incorporated in the already available information. This section illustrates, by way of example, some of the types of information that may be available and the manner in which the available information is represented and encoded.

In general, a set of information is represented by an uncertainty region representation. In some embodiments, the uncertainty region representation consists of a set of linear inequality constraints $$h_k \cdot x + g_k \cdot v \leq b_k, k=1,\ldots, K, \tag{17}$$

where K is the number of constraints needed to encode the set of information. These constraints are stored inside the fusion engine, block 430 of FIG. 4. In some embodiments, quadratic or other convex constraints are also used. In other embodiments, non-convex constraints are also used including those represented by mixed-integer programs and other combinatorial structures.

It should be pointed out that the formulas $$h_k \cdot x + g_k \cdot v \leq b_k$$

and $$-h_k \cdot x - g_k \cdot v \geq -b_k$$

are equivalent representations of the same constraint. In the following, the most convenient of these two representations will be used for exposition purposes.

Code-phase

In one embodiment, code-phase information is represented by an uncertainty interval $[\sigma_i^{min}, \sigma_i^{max}]$ known to contain, with sufficient degree of confidence, the code-phase for a given source observed by the receiver at the query event, $\sigma_i(Q)$. Whenever the code-phase variables take values in a circular domain, one skilled in the art knows how to make the necessary adjustments to ensure that code-phase uncertainty intervals and code-phase constraints are implemented and interpreted appropriately.

Block 456 inside the fusion engine 430 contains the constraints corresponding to the code-phase uncertainty interval $[\sigma_i^{min}, \sigma_i^{max}]$, given by:

$$a_i^{1,1} \cdot x \leq \sigma_i^{max} - \sigma_i(Q^*), \tag{18}$$

$$a_i^{1,1} \cdot x \geq \sigma_i^{min} - \sigma_i(Q^*). \tag{19}$$

The method to calculate $a_i^{1,1}$ was described in section "Calculation of the linear coefficients and offsets" (block 560 of FIG. 5).

Doppler-shift

Doppler-shift information can be represented by an uncertainty interval $[f_i^{min}, f_i^{max}]$ and can be encoded by the LP inequality constraints:

$$a_i^{2,1} \cdot x + a_i^{2,2} \cdot v \leq f_i^{max} - f_i(Q^*, \dot{Q}^*), \tag{20}$$

$$a_i^{2,1} \cdot x + a_i^{2,2} \cdot v \geq f_i^{min} - f_i(Q^*, \dot{Q}^*). \tag{21}$$

These are stored in block 455 of the fusion engine 430. The method to calculate $a_i^{2,1}$ and $a_i^{2,2}$ was described in section "Calculation of the linear coefficients and offsets" (block 560 of FIG. 5).

Spatial Location

Information about the spatial location of the receiver at the query time is represented by a set of inequality constraints of the form $$\vec{h}_k \cdot \vec{x} \leq b_k, k=1, \ldots, K \tag{22}$$

where $\vec{x}$ is the three-dimensional spatial component of the four-dimensional variable $x=(ct, \vec{x})$. These constraints are stored in block 451 of the fusion engine. In some embodiments, these constraints represent a convex polyhedron or an unbounded region between parallel planes that contains the true receiver's location with suitably high degree of confidence. The values of the parameters $\vec{h}_k$ and $b_k$ are calculated according to what frame of observation F has been chosen. For example, if F is the frame $F^{left}(Q^*)$ centered at the approximate location of the receiver and with the axes oriented along the longitude, latitude and altitude directions, then the following six inequalities are used to constrain the receiver in an uncertainty box of size $2X_{hor}$ (horizontally) and $2X_{ver}$ (vertically):

$$x_1 \leq X_{hor}, x_1 \geq -X_{hor}, \tag{23}$$

$$x_2 \leq X_{hor}, x_2 \geq -X_{hor}, \tag{24}$$

$$x_3 \leq X_{ver}, x_3 \geq -X_{ver}, \tag{25}$$

where $\vec{x} = (x_1, x_2, x_3)$. In some embodiments, such an uncertainty box can be the uncertainty region associated with the initial coarse estimate of the receiver's location. In other embodiments, the uncertainty region can be represented by an appropriate convex polytope and one skilled in the art will see how such a polytope can be expressed as linear inequality constraints.

Velocity

Similarly, information about the velocity of the receiver is encoded by constrains of the form:

$$\vec{g}_k \cdot \vec{v} \leq b_k, k=1, \ldots, K. \tag{26}$$

Velocity constraints are stored in block 452 of the fusion engine. For example, if $F=F^{left}(Q^*)$, the following inequality constraints are used if the horizontal and vertical velocities of the receiver are known to be less than $V_{hor}$ and $V_{ver}$ respectively:

$$v_1 \leq V_{hor}, v_1 \geq -V_{hor}, \tag{27}$$

$$v_2 \leq V_{hor}, v_2 \geq -V_{hor}, \tag{28}$$

$$v_3 \leq V_{ver}, v_3 \geq -V_{ver}. \tag{29}$$

Clock

Information about the receiver's clock offset and drift rate are represented by the constrains $$x_0 \le cT, \ x_0 \ge -cT, \quad (30)$$

$$v_0 \le c\gamma, \ v_0 \ge -c\gamma, \quad (31)$$

where T is the maximum clock offset and $\gamma$ is the maximum drift rate (and $x_0 = ct - ct^*$). These constraints are stored in blocks 453 and 454 respectively.

Deducing New Information

This section illustrates, by way of example, what kinds of information can be obtained by means of this invention and how to process a query for such information. In some embodiments, information is obtained by solving a set of constrained linear optimization problems, each of which determines a bound on some scalar variable of interest z. Consider a variable z of the form $$z = z_0 + h \cdot x + g \cdot v. \quad (32)$$

The lower and upper bounds of z are determined by:

$$z_i^{min} = z_0 + \min_{Hx+Gv \le b} (h \cdot x + g \cdot v), \quad (33)$$

$$z_i^{max} = z_0 + \max_{Hx+Gv \le b} (h \cdot x + g \cdot v) \quad (34)$$

where $Hx+Gv \le b$ is a matrix representation of the set of all inequality constraints $\{h_k \cdot x + g_k \cdot v, k=1, \ldots, K\}$ that encode the current set of information. In this particular embodiment, the uncertainty region representation is the vector inequality $Hx+Gv \le b$.

Block 466 computes code-phase bounds on demand by means of the formulae:

$$\sigma_i^{max} = \sigma_i(Q^*) + \max_{Hx+Gv \le b} (a_i^{1,1} \cdot x) \quad (35)$$

$$\sigma_i^{min} = \sigma_i(Q^*) + \min_{Hx+Gv \le b} (a_i^{1,1} \cdot x) \quad (36)$$

Block 465 computes Doppler-shifts bounds by means of the formulae:

$$f_i^{max} = f_i(Q^*, \dot{Q}^*) + \max_{Hx+Gv \le b} (a_i^{2,1} \cdot x + a_i^{2,2} \cdot v) \quad (37)$$

$$f_i^{min} = f_i(Q^*, \dot{Q}^*) + \min_{Hx+Gv \le b} (a_i^{2,1} \cdot x + a_i^{2,2} \cdot v) \quad (38)$$

Bounds for other variable of interest such as receiver location, velocity, clock offset and clock drift rate can be obtained in a similar way (blocks 461, 462 and 463).

In one embodiment, the calculations for solving the min and max optimization problems in the above LP equations can be simplified by neglecting the "cross-term" $a_i^{2,1}$. By means of this approximation, the LP equations over the 8-dimensional linear space in $(x, v)$ decompose into two independent spaces in x and v respectively, as one skilled in the art can see, and the optimization problems can be solved separately in these smaller spaces, thus reducing the total amount of calculations.

In certain situations, such as in the presence of multipath interference, invalid information associated with one or more sources can result in the above optimization problems not having any solution. These exceptional events can be detected and one skilled in the art can devise a method to be used to determine which sources are providing invalid information. In some embodiments, one possible method is to test all possible subsets of sources to determine the subset of sources that provides the most consistent subset of associated constraints. Alternatively, one could determine the largest subset of sources whose resulting constraints exceeds a pre-determined level of consistency. One way to measure the consistency of a set of sources is to use a statistical test based on the standard deviation of the receiver parameters, as one skilled in the art will see.

Calculation of Uncertainty Intervals

Block 415 calculates uncertainty intervals for the code-phase and Doppler shifts by using a function $A(f, \sigma)$ that expresses the probability that the code-phase $\sigma_i(Q)$ and Doppler shift $f_i(Q, \dot{Q})$ at the query time have particular values. In some embodiments used for GPS applications, such a function is often called an "ambiguity function". In some embodiments, the ambiguity function $A(f, \sigma)$ is given by the square magnitude $I^2(f, \sigma) + Q^2(f, \sigma)$ of the complex IQ correlation between the known signal associated with the given source and the selected segment of received signal, modulated at the appropriate frequency f and with the hypothesized delay corresponding to code-phase $\sigma$. One skilled in the art knows how to calculate these correlations. Improved techniques to calculate these correlations are described further in U.S. patent application Ser. No. 09/888,228, filed on the same day herewith, entitled "Signal Acquisition Using Data Bit Information", by inventors Anant Sahai, Wallace Mann, Andrew Chou and Benjamin Van Roy, U.S. patent application Ser. No. 09/888,227, filed on the same day herewith, entitled "Synthesizing Coherent Correlation Sums at One or Multiple Carrier Frequencies Using Correlation Sums Calculated at a Coarse Set of Frequencies", by inventors Anant Sahai and John Tsitsiklis, and U.S. patent application Ser. No. 09/888,338, entitled "Extracting Fine-Tuned Estimates from Correlation Functions Evaluated at a Limited Number of Values" by Anant Sahai, John Tsitsiklis, Stefano Casadei, Andrew Chou, Benjamin Van Roy and Jesse Robert Stone, filed on the same day herewith. The aforementioned U.S. patent applications describe ways of refining these calculations in small neighborhoods.

One method to implement block 415 is to determine "nominal" values of code-phase and Doppler shift, $\sigma_i^{nom}$ and $f_i^{nom}$, by locating the maximum of the function $A(f, \sigma)$. Then uncertainty intervals can be defined by using given risk/safety margins around these nominal values:

$$\sigma_i^{min} = \sigma_i^{nom} - \sigma_i^{dev}, \ \sigma_i^{max} = \sigma_i^{nom} + \sigma_i^{dev}, \quad (39)$$

$$f_i^{min} = f_i^{nom} - f_i^{dev}, \ f_i^{max} = f_i^{nom} + f_i^{dev}, \quad (40)$$

where $\sigma_i^{dev}$ and $f_i^{dev}$ denote here given values of the risk/safety margins. For example, in some embodiments, a code-phase margin of 1 $\mu$sec can be used, and a Doppler-shift margin of one cycle ($2\pi$) divided by the duration of the collected signal can be used. Alternatively, one skilled in the art can adjust these margins according to the height of the peak in the function $A(f, \sigma)$, with smaller margins chosen for larger heights of the peak.

If the given function $A(f, \sigma)$ represents or is proportional to a modeled probability density, then one skilled in the art will see that another method to determine uncertainty intervals is to use statistical techniques to define the margins $\sigma_i^{dev}$ and $f_i^{dev}$ around the nominal values in such a way that the confidence that these intervals contain the true value of code-phase and Doppler-shifts is above a suitable threshold.

Another method is to choose the convex hull of all the code-phase values and Doppler shift values for which A(f, σ) is above a certain threshold. This threshold can be given a-priori, or it can be determined according to the peak value of A(f, σ) (for example, a certain fraction of the peak value, or the peak value minus a certain constant) or it can be specified by using a confidence threshold. One skilled in the art will see that there are many ways of determining an interval from the observations.

In some situations it is appropriate to provide only an upper bound $\sigma_i^{max}$ to the code-phase. For example, if the function A(f, σ) contains multiple large peaks or other indications of significant multipath interference, then the largest peak might be due to a reflected path. In this case, the code-phase of this peak provides an upper bound to the value of the true code-phase which always corresponds to the direct path.

In some embodiments, if the signal search in the segment is judged to be inconclusive then the uncertainty intervals corresponding to this signal source and segment is set to large intervals or the constraints associated with the signal source are simply removed from the representation. One skilled in the art will see that a search can be judged to be inconclusive for many reasons depending on the application requirements, but one such way is for the magnitude of the correlations to all be below a given threshold in the region being searched. This threshold can be determined by many means. In some embodiments, the threshold is determined by considering the probability of false acquisition and adjusting the size of the threshold based on the size of the range of signal parameters being searched over so as to keep the probability of false acquisition suitably small.

Regardless of what method is used to calculate uncertainty intervals for $\sigma_i$ and $f_i$, these intervals can be improved in some embodiments by taking into account the error due to the linear approximation made. This extra width, that needs to be added the uncertainty intervals, can be determined by calculating an upper bound to the magnitude of the non-linear terms neglected in the linear approximation. One skilled in the art can see that this upper bound can be calculated in many possible ways. In some embodiments, the code-phase uncertainty interval can be corrected for non-linear terms by increasing it on each side by the following amount:

$$\frac{1}{c}\left(\frac{R^2}{R+r_i} + Tv_i\right), \quad (41)$$

where R is the maximum distance from the linearization point to the receiver; $r_i$ is the distance from the linearization point to source $S_i$; $v_i$ is the magnitude of the source velocity; and T is maximum clock offset of the receiver.

Hardware Overview

An embodiment of the invention may be implemented using a computer system that includes a processor for processing information. The Computer system also includes a main memory, such as a random access memory (RAM) or other dynamic storage device, coupled to a bus for storing information and instructions to be executed by the processor. The main memory also may be used for storing temporary variables or other intermediate information during execution of instructions to be executed by the processor. The computer system further includes a read only memory (ROM) or other static storage device coupled to the bus for storing static information and instructions for the processor. A storage device, such as a magnetic disk or optical disk, is provided and coupled to the bus for storing information and instructions.

The invention is related to the use of the computer system for implementing the techniques described herein. According to one embodiment of the invention, those techniques are implemented by the computer system in response to the processor executing one or more sequences of one or more instructions contained in main memory. Such instructions may be read into the main memory from another computer-readable medium, such as the storage device. Execution of the sequences of instructions contained in the main memory causes the processor to perform the process steps described herein. One or more processors in a multi-processing arrangement may also be employed to execute the sequences of instructions contained in the main memory. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor for execution. Such a medium may take many forms, including but not limited to, non-volatile media, volatile media, and transmission media. Non-volatile media includes, for example, optical or magnetic disks, such as the storage device. Volatile media includes dynamic memory, such as the main memory. Transmission media includes coaxial cables, copper wire and fiber optics, including the wires that comprise the bus. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on the storage device either before or after execution by the processor.

The computer system also includes a communication interface coupled to the bus. The communication interface provides a two-way data communication coupling to a network link that is connected to a local network. For example, the communication interface may be an integrated services digital network (ISDN) card or a modem to provide a data communication connection to a corresponding type of telephone line. As another example, the communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection through the local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the communication interface, which carry the digital data to and from the computer system, are exemplary forms of carrier waves transporting the information.

The computer system can send messages and receive data, including program code, through the network(s), the network link and the communication interface. In the Internet example, a server might transmit a requested code for an application program through the Internet, the ISP, the local network and the communication interface. In accordance with the invention, one such downloaded application implements the techniques described herein.

The received code may be executed by the processor as it is received, and/or stored in the storage device, or other non-volatile storage for later execution. In this manner, the computer system may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining one or more target receiver parameter values wherein the one or more target receiver parameter values is a member of a set of receiver parameter values that are associated with a receiver, the method comprising the computer-implemented steps of:

step A: receiving from the receiver, sampled data associated with a received signal that is received at the receiver;

step B: dividing the sampled data into a set of overlapping data segments;

step C: receiving a set of information that is associated with:
the set of receiver parameter values; and
a set of signal parameter values;

step D: determining a current region of uncertainty for the set of receiver parameter values using the set of information;

step E: selecting a data segment that has not been previously selected to be selected data segment and performing the steps of:

step F: selecting a signal source that has not been previously selected to be a selected signal source, wherein the signal source is from a set of signal sources associated with the receiver signal;

step G: forming a selected data segment-source pair comprising the selected data segment and the selected signal source;

step H: for the selected segment-source pair, determining in the current region of uncertainty one or more ranges of interest that correspond to the one or more target receiver parameter values;

step I: using the selected segment-source pair and using the one or more ranges of interest that correspond to the one or more target receiver parameter values, determining one or more functions that correspond to the receiver parameter values and the signal parameter values;

step J: updating the current region of uncertainty using the one or more functions; and step K: repeating steps E through K until the current region of uncertainty satisfies a pre-determined termination condition.

2. The method of claim 1, wherein using the one or more functions involves expressing the one or more functions as inequalities.

3. The method of claim 1, wherein the set of information that is associated with the set of receiver parameter values and the set of signal parameters comprises linear inequalities, wherein the linear inequalities restrict the receiver parameter values and the signal parameter values.

4. The method of claim 1, wherein the set of information that are associated with the set of receiver parameter values and the set of signal parameters comprises non-linear inequalities, wherein the non-linear inequalities restrict the receiver parameter values and the signal parameter values.

5. The method of claim 1, wherein the set of information that is associated with the set of receiver parameter values and the set of signal parameters are received from one or more systems that uses techniques to solve for a location of the receiver.

6. The method of claim 1, wherein the set of receiver parameter values comprises:
a location of the receiver;
a velocity of the receiver;
a clock Doppler of the receiver; and
a starting time when the received signal is received at the receiver.

7. The method of claim 1, wherein the set of signal parameter values comprises:
a delay value associated with the received signal; and
a carrier frequency value associated with the received signal.

8. The method of claim 1, further comprising the steps of:
determining a selected set of signal parameter values contained in this uncertainty region for selected source;
searching in the selected segment-source pair for the known signal corresponding to the selected source, by means of hypothesizing all the signal parameter values in the selected set of signal parameter values.

9. The method of claim 1, wherein the set of overlapping data segments comprises a nested sequence of data segments of increasing length; and the selected data segment is greater in length than a previously selected segment.

10. A method for determining a clock doppler value of a receiver, the method comprising the computer-implemented steps of:

receiving from the receiver, sampled data associated with a received signal;

dividing the sampled data into a set of data segments, wherein each successive data segment from the set of data segments is formed by including all previous data segments plus additional data from the sampled to reach a pre-determined segment length; and using each data segment for estimating the clock doppler value based on results corresponding to a set of satellites that is overhead the receiver.

11. The method of claim 10, further comprising selecting a shortest data segment that has not been previously selected from the set of segments to be a selected data segment for performing computations for estimating the clock doppler value.

12. The method of claim 10, wherein the clock doppler value is implicitly determined by estimating a carrier frequency value of the received signal.

13. The method of claim 10, further comprising the steps of:
   using a shortest data segment that has not been previously selected from the set of data segments in conjunction with information associated with a selected satellite that has not been previously selected from the set of satellites that is overhead the receiver for updating a current bounds on a carrier frequency value of the received signal and for updating a current bounds on a delay value; and
   continuing to update the current bounds on the carrier frequency value and the current bounds on the delay value by using the shortest data segment in conjunction with information associated with a next selected satellite that has not been previously selected from the set of satellites until all the satellites have been selected.

14. The method of claim 10, further comprising the steps of:
   using a shortest data segment that has not been previously selected from the set of data segments in conjunction with information associated with a selected satellite that has not been previously selected from the set of satellites that is overhead the receiver for updating a current bounds on a carrier frequency value of the received signal and for updating a current bounds on a delay value; and
   continuing to update the current bounds on the carrier frequency value and the current bounds on the delay value by using the shortest data segment in conjunction with information associated with a next selected satellite that has not been previously selected from the set of satellites until a pre-determined level of accuracy of a clock doppler value is reached.

15. The method of claim 10, further comprising the steps of:
   if a current bounds for a delay value and a current bounds for a carrier frequency value has not been previously computed, then:
      computing the current bounds for the delay value with respect to a selected satellite based on:
         an approximate time that the receiver received the received signal; and
         a relative approximate position information between the selected satellite and the receiver; and
      computing a current bounds for the carrier frequency value with respect to the selected satellite based on:
         relative clock correction factors between the selected satellite and the receiver;
         a navigation bit information associated with the selected satellite; and
         characteristics of a filter used to sample the received signal.

16. The method of claim 10, further comprising the step of:
   if a current bounds for the delay value and a current bounds for a carrier frequency value have been previously computed, then using an updated current bounds for a delay value as the current bounds for the delay value and an updated current bounds for the carrier frequency value as the current bounds for the carrier frequency value.

17. The method of claim 10, further comprising the steps of:
   if a current bounds for a carrier frequency value exceeds a pre-determined bound-width value for the carrier frequency value and a current bounds for a delay value exceeds a predetermined bound-width value for the delay value, then performing the steps of:
      dividing a range of frequency of interest into a first set of frequency intervals and a second set of frequency intervals;
      selecting a data segment from the set of data segments to be a selected data segment;
      dividing the selected data segment into a set of data blocks corresponding to the first set of frequency intervals;
      for each data block within the set of data blocks, calculating an I correlation integral and a Q correlation integral based on the selected satellite;
      for every frequency interval of the second set of frequency intervals, summing the I correlation integral over all the data blocks from the set of data blocks without re-calculating the I correlation integral;
      for every frequency interval of the second set of frequency intervals, summing the Q correlation integral over all the data blocks from the set of data blocks without re-calculating the Q correlation integral;
      for each hypothesized delay value within the current bounds of the delay value, calculating a magnitude of the of the I and Q correlation integrals that were previously summed over all the data blocks, to produce a set of magnitude calculations, wherein the set of magnitude calculations correspond to the hypothesized delay values;
      selecting as an estimate for the carrier frequency value, the carrier frequency value corresponding to a highest magnitude calculation from the set of magnitude calculations; and
      selecting as an estimate for the delay value, the delay value corresponding to the highest magnitude calculation from the set of magnitude calculations.

18. The method of claim 10, further comprising the step of:
   if a current bounds for a carrier frequency value is within a pre-determined bound-width value for the carrier frequency value and a current bounds for a delay value is within a pre-determined bound-width value for the delay value, then determining a magnitude template using magnitude calculations of I and Q correlation integrals that are calculated at a plurality of carrier frequency values from within the current bounds for the carrier frequency value and at a plurality of delay values from within the current bounds for the delay value.

19. The method of claim 10, further comprising the steps of:
   if a current bounds for a carrier frequency value is within a pre-determined bound-width value for the carrier frequency value and a current bounds for a delay value is within a pre-determined bound-width value for the delay value, then performing the steps of:

selecting as an initial carrier frequency value, one of the carrier frequency values that has not been previously selected from within the current bounds for the carrier frequency value;

selecting a delta value corresponding to the initial carrier frequency value;

selecting one or more candidates of delay values from within the current bounds for the delay value;

for each candidate of delay value, calculating an I correlation integral and a Q correlation integral at the initial carrier frequency value, at the initial carrier frequency value plus the delta value, and at the initial carrier frequency value minus the delta value;

for each candidate of delay value, calculating a magnitude of the I and Q correlation integrals at the initial carrier frequency value, at the initial carrier frequency value plus the delta value, and at the initial carrier frequency value minus the delta value;

for each candidate of delay value, curve-fitting to produce a magnitude template using the magnitude of the I and Q correlation integrals that are calculated at the initial carrier frequency value, at the initial carrier frequency value plus the delta value, and at the initial carrier frequency value minus the delta value;

for each candidate of delay value, selecting as a new carrier frequency value, a carrier frequency value that corresponds to a peak of the magnitude template;

selecting as an estimate for the carrier frequency value, an average of the new carrier frequency values corresponding to all the candidates of delay value; and selecting as an estimate for the delay value, the delay value that corresponds to the average of the new carrier frequency value.

20. The method of claim 10, further comprising the step of:

if an estimate for a carrier frequency value satisfies a pre-determined tolerance value for the carrier frequency value and an estimate for a delay value satisfies a pre-determined tolerance value for the delay value, then updating a current bounds for the carrier frequency value and updating a current bounds for the delay value based on an estimate for the carrier frequency value and the estimate of the delay value to produce an updated current bounds for the carrier frequency and an updated current bounds for the delay value.

21. The method of claim 10, wherein each successive data segment has a length that is a function of a duration of the sampled data.

22. The method of claim 10, wherein a pre-determined segment length for a $(j+1)^{th}$ successive data segment is 3 to the power of j, wherein j ranges in value from zero to a total number of successive data segments.

23. The method of claim 10, wherein a pre-determined segment length for each $(j+1)^{th}$ successive data segment is 1.62 to the power of j, wherein j ranges in value from zero to a total number of successive data segments.

24. A method for determining a clock doppler value of a receiver, the method comprising the computer-implemented steps of:

receiving from the receiver, sampled data that includes signal information from a plurality of signal sources;

dividing the sampled data into a set of data segments, wherein each successive data segment from the set of data segments is formed by including all previous data segments plus additional data from the sampled to reach a pre-determined segment length; and for each data segment performing the steps of:
determining an estimate of the clock doppler value based on the signal information of a first signal source from the plurality of signal sources;

using the estimate of the clock doppler based on the signal information of the first signal source in determining the estimate of the clock doppler based on the signal information of a second signal source from the plurality of signal sources.

25. A method for determining a clock doppler value of a receiver, the method comprising the computer-implemented steps of:

Step A: receiving from the receiver, sampled data associated with a received signal;

Step B: dividing the sampled data into a set of data segments, wherein each successive data segment from the set of data segments is formed by including all previous data segments plus additional data from the sampled to reach a pre-determined segment length;

Step C: selecting a shortest data segment that has not been previously selected from the set of data segments to be a selected data segment;

Step D: selecting one satellite that has not been previously selected from a set of satellites that is overhead the receiver to be a selected satellite;

Step E: estimating the clock doppler value based on the selected satellite and the selected data segment;

Step F: repeating step D through step F until all the satellites from the set of satellites have been selected as the selected satellite; and Step G: repeating steps C through G until all data segments from the set of data segments have been selected to be the selected data segment.

26. A method for determining a clock doppler value of a receiver, the method comprising the computer-implemented steps of:

Step A: receiving from the receiver, sampled data associated with a received signal;

Step B: dividing the sampled data into a set of data segments, wherein each successive data segment from the set of data segments is formed by including all previous data segments plus additional data from the sampled to reach a pre-determined segment length;

Step C: selecting a shortest data segment that has not been previously selected from the set of data segments to be a selected data segment;

Step D: selecting one satellite that has not been previously selected from a set of satellites that is overhead the receiver to be a selected satellite;

Step E: estimating the clock doppler value based on the selected satellite and the selected data segment by performing the steps of:

Step F: computing a current bounds for a delay value and a current bounds for a carrier frequency value associated with the received signal if not previously computed based on the selected satellite;

Step G: updating the current bounds for the delay value and updating the current bounds for the carrier frequency value based on the selected satellite and the selected data segment if a set of criteria is satisfied, wherein the set of criteria comprises:

if the current bounds for the delay value and the current bounds for the carrier frequency value are previously computed; and if an estimate of the carrier frequency value satisfies a pre-determined tolerance value of carrier frequency value and an estimate of the delay value satisfies a pre-determined tolerance value of the delay value;

Step H: repeating step D through step H until all the satellites from the set of satellites have been selected as the selected satellite;

Step I: repeating steps C through I until all data segments from the set of data segments have been selected as the selected data segment;

Step J: extracting the clock doppler value from the estimate of the carrier frequency.

27. A method for determining a clock doppler value of a receiver, the method comprising the computer-implemented steps of:

Step A: receiving from the receiver, sampled data associated with a received signal;

Step B: dividing the sampled data into a set of data segments, wherein each successive data segment from the set of data segments is formed by including all previous data segments plus additional data from the sampled to reach a pre-determined segment length;

Step C: selecting a shortest data segment that has not been previously selected from the set of data segments to be a selected data segment for performing the steps of:

Step D: selecting one satellite that has not been previously selected from a set of satellites that is overhead the receiver to be a selected satellite;

Step E: if a current bounds for a delay value and a current bounds for a carrier frequency value associated with the received signal have not been previously computed, then performing the steps of:

Step F: computing current bounds for the delay value with respect to the selected satellite based on:
an approximate time that the receiver received the received signal; and
a relative approximate position information between the selected satellite and the receiver;

Step G: computing current bounds for the carrier frequency value with respect to the selected satellite based on:
relative clock correction factors between the selected satellite and the receiver;
a navigation bit information associated with the selected satellite; and
characteristics of a filter used to sample the received signal;

Step H: if the current bounds for the delay value and the current bounds for the carrier frequency value have been previously computed, then using an updated current bounds for the delay value as the current bounds for the delay value and an updated current bounds for the carrier frequency value as the current bounds for the carrier frequency value;

Step I: determining an estimate for the clock doppler value and an estimate for the delay value using the selected data segment by performing the steps of:

Step J: if the current bounds for the carrier frequency value exceeds a pre-determined bound-width value for the carrier frequency value and the current bounds for the delay value exceeds a pre-determined bound-width value for the delay value, then performing the steps of:

Step K: dividing a range of frequency of interest into a first set of frequency intervals and a second set of frequency intervals;

Step L: dividing the selected data segment into a set of data blocks corresponding to the first set of frequency intervals;

Step M: for each data block within the set of data blocks, calculating an I correlation integral and a Q correlation integral based on the selected satellite;

Step N: for every frequency interval of the second set of frequency intervals, summing the I correlation integral over all the data blocks from the set of data blocks without re-calculating the I correlation integral; and Step O: for every frequency interval of the second set of frequency intervals, summing the Q correlation integral over all the data blocks from the set of data blocks without re-calculating the Q correlation integral;

Step P: for each hypothesized delay value within the current bounds of the delay value, calculating a magnitude of the of the I and Q correlation integrals that were previously summed over all the data blocks, to produce a set of magnitude calculations, wherein the set of magnitude calculations correspond to the hypothesized delay values;

Step Q: selecting as an estimate for the carrier frequency value, the carrier frequency value corresponding to a highest magnitude calculation from the set of magnitude calculations;

Step R: selecting as the estimate for the delay value, the delay value corresponding to the highest magnitude calculation from the set of magnitude calculations;

Step S: if the current bounds for the carrier frequency value is within the pre-determined bound-width value for the carrier frequency value and the current bounds for the delay value is within the pre-determined bound-width value for the delay value, then performing the steps of:

Step T: selecting as an initial carrier frequency value, one of the carrier frequency values that has not been previously selected from within the current bounds for the carrier frequency value;

Step U: selecting a delta value corresponding to the initial carrier frequency value;

Step V: selecting one or more candidates of delay values from within the current bounds for the delay value;

Step W: for each candidate of delay value, calculating the I and Q correlation integrals at the initial carrier frequency value, at the initial carrier frequency value plus the delta value, and at the initial carrier frequency value minus the delta value;

Step X: for each candidate of delay value, calculating the magnitude of the I and Q correlation integrals at the initial carrier frequency value, at the initial carrier frequency value plus the delta value, and at the initial carrier frequency value minus the delta value;

Step Y: for each candidate of delay value, curve-fitting a magnitude template using the magnitude of the I and Q correlation integrals that are calculated at the initial carrier frequency value, at the initial carrier frequency value plus the delta value, and at the initial carrier frequency value minus the delta value;

Step Z: for each candidate of delay value, selecting as a new carrier frequency value, a carrier frequency value that corresponds to the peak of the magnitude template;

Step ZA: selecting as the estimate for the carrier frequency values corresponding to all the candidates of delay values;

Step ZB: selecting as the estimate for the delay value, the delay value that corresponds to the average of the new carrier frequency value;

Step ZC: if the estimate for the carrier frequency value satisfies a pre-determined tolerance value for the carrier frequency value and the estimate for the delay value satisfies a predetermined tolerance value for the delay value, then updating the current bounds for the delay value based on the estimate for the carrier frequency value and the estimate of the delay value to produce the updated current bounds for the carrier frequency and the updated current bounds for the delay value;

Step ZD: repeating steps D through ZD until all the satellites from the set of satellites have been previously selected to be the selected satellite;

Step ZE: repeating steps C through ZE until all data segments form the set of data segments have been previously selected to be the selected data segment;

Step ZF: extracting the clock doppler value from the estimate of the carrier frequency.

28. A method to determine a plurality of estimates, wherein each estimate is for one receiver parameter belonging to a set of receiver parameters associated with a receiver, the method comprising the steps of:

step A: receiving at said receiver, a received signal which contains a plurality of known signals, wherein each known signal is associated with one source from a set of possible sources;

step B: dividing said received signal into a set of possibly overlapping segments;

step C: determining a selected segment-source pair consisting of a selected segment from said set of possibly overlapping segments and a selected source from said set of possible sources;

step D: searching in said selected segment for the known signal associated with said selected source by using an uncertainty region representation;

step E: updating said uncertainty region representation;

step F: estimating one or more receiver parameters by means of said uncertainty region representation;

step G: iterating steps D,E,F and F until said uncertainty region representation satisfies a pre-determined termination condition or all possible segment-source pairs have been processed.

29. The method of claim 28, where step D (searching) comprises the steps of:

Step 1: representing a set of signal parameters for said selected source; and

Step 2: deriving a signal uncertainty region for said set of signal parameters by means of said uncertainty region representation.

30. The method of claim 28, where step D (searching) comprises the steps of:

Step 1: representing a set of signal parameters for said selected source, wherein said set of signal parameters comprises a signal delay and a carrier frequency; and Step 2: deriving a signal uncertainty region for said set of signal parameters by means of said uncertainty region representation.

31. The method of claim 30, wherein said set of receiver parameters comprises a receiver location parameter, a receiver velocity parameter, a clock offset parameter, and a clock Doppler parameter.

32. The method of claim 30, wherein step D (searching) further comprises the steps of:

step 1: determining a selected set of signal parameter values contained in said signal uncertainty region;

step 2: considering a hypothesized signal parameter value from said selected set of signal parameter values;

step 3: searching in said selected segment for the known signal corresponding to said selected source and to said hypothesized signal parameter value; and step 4: repeating step 2 and step 3 until said known signal is found or until all signal parameter values in said selected set of signal parameter values have been hypothesized.

33. The method of claim 32, wherein step G further comprises the steps of:

Step 1: iterating through an increasing sequence of selected segments; and

Step 2: iterating through said set of possible sources each time that a new selected segment is selected.

34. The method of claim 30, wherein said selected segment includes any selected segment that was selected during a preceding iterations.

35. The method of claim 30, wherein step G further comprises the steps of:

Step 1: iterating through an increasing sequence of selected segments; and

Step 2: iterating through said set of possible sources each time that a new selected segment is selected.

36. The method of claim 35 where said set of receiver parameters comprises a receiver location parameter, a receiver velocity parameter, a clock offset parameter, and a clock drift rate parameter.

37. The method of claim 30 further comprising the step of deriving an initial uncertainty representation from a set of initial information.

38. The method of claim 30, further comprising the steps of:

deriving an initial uncertainty representation from a set of initial information, wherein said set of initial information comprises a receiver location information;

deriving said receiver location information from an information on cell tower location and an information on direction of arrival of said received signal.

39. The method of claim 30, wherein step D (searching) further comprises the step of:

calculating a correlation magnitude between the known signal of said selected source and said selected segment.

40. The method of claim 30, further comprising the step of:

calculating a correlation magnitude between the known signal of said selected source and said selected segment;

setting a threshold value; and comparing said correlation magnitude with said threshold value.

41. The method of claim 30, further comprising the step of:

calculating a correlation magnitude between the known signal of said selected source and said selected segment;

calculating a size of said signal uncertainty region;

setting a threshold value based on said size of said signal uncertainty region; and comparing said correlation magnitude with said threshold value.

42. The method of claim 30, wherein said uncertainty region representation comprises a system of inequalities.

43. The method of claim 30, wherein said uncertainty region representation comprises a system of linear inequalities.

44. The method of claim 30, further comprising the steps of:

using a system of linear equations representing an approximate relationship between said set of receiver parameters and said set of signal parameters; and defining said uncertainty region representation based on a system of linear inequalities, wherein said linear inequalities are based on said system of linear equations.

45. The method of claim 44, further comprising the steps of:

comparing an updated estimate of receiver parameters with a current estimate of receiver parameters; and updating said system of linear equations based on the result of the comparison.

46. The method of claim 44, wherein said set of receiver parameters comprises a receiver location parameter and a clock offset parameter; and said system of linear inequalities comprises a plurality of inequalities for said code-phase parameter, a plurality of inequalities for said carrier frequency parameter, a plurality of inequalities for said receiver location parameter, and a set of inequalities for said clock offset parameter.

47. The method of claim 44, wherein said set of receiver parameters comprises a receiver location parameter, a receiver velocity parameter, a clock offset parameter, and a clock Doppler parameter; and said system of linear inequalities comprises a plurality of inequalities for said code-phase parameter, a plurality of inequalities for said carrier frequency parameter, a plurality of inequalities for said receiver location parameter, a plurality of inequalities for said receiver velocity parameter, a plurality of inequalities for said clock offset parameter and a plurality of inequalities for said clock Doppler parameter.

48. The method of claim 47, where said system of linear equations are approximated by a first system of linear equations and a second system of equations, wherein said first system of equations is for said receiver location parameter and said clock offset parameter and said second system of equations is for said receiver velocity parameter and said clock Doppler parameter, and wherein said first system of equations and said second system of equations are made independent of each other by eliminating the cross-term from said second system of equations.

49. The method of claim 44, where said pre-determined termination condition is satisfied when a receiver location uncertainty region is contained in a bounding box.

50. The method of claim 44, further comprising the steps of:

calculating a correlation magnitude between the known signal of said selected source and said selected segment;

calculating the size of said signal uncertainty region;

setting a threshold value based on the calculated size of said signal uncertainty region; and comparing said correlation magnitude with said threshold value.

51. The method of claim 50, further comprising the steps of:

comparing an updated estimate of receiver parameters with a current estimate of receiver parameters; and updating said system of linear equations based on the result of the comparison.

52. The method of claim 30, further comprising the step of:

using a system of nonlinear equations representing an accurate relationship between said set of receiver parameters and said set of signal parameters;

using a system of linear equations representing an approximate relationship between said set of receiver parameters and said set of signal parameters;

defining said uncertainty region representation based on a system of linear inequalities;

calculating an error bound between said system of nonlinear equations and said system of linear equations; and adapting said signal uncertainty region to said error bound.

53. The method of claim 52, further comprising the steps of:

calculating a correlation magnitude between the known signal of said selected source and said selected segment;

calculating the size of said signal uncertainty region;

setting a threshold value based on the calculated size of said signal uncertainty region; and comparing said correlation magnitude with said threshold value.

54. The method of claim 53, further comprising the steps of:

comparing an updated estimate of receiver parameters with a current estimate of receiver parameters; and updating said system of linear equations based on the result of the comparison.

* * * * *